United States Patent [19]

Scott

[11] 4,094,108

[45] * June 13, 1978

[54] CONTROLLED DESTRUCTIVE PANEL ASSEMBLY

[75] Inventor: Harley D. Scott, Wexford, Pa.

[73] Assignee: Cyclops Corporation, Pittsburgh, Pa.

[*] Notice: The portion of the term of this patent subsequent to Sep. 27, 1994, has been disclaimed.

[21] Appl. No.: 812,119

[22] Filed: Jul. 1, 1977

Related U.S. Application Data

[63] Continuation-in-part of Ser. No. 681,820, Apr. 30 1976, Pat. No. 4,050,204.

[51] Int. Cl.² .............................................. E04H 9/00
[52] U.S. Cl. .............................................. 52/1; 52/98;
52/478; 52/480; 52/630
[58] Field of Search ........................ 52/1, 98, 478, 521,
52/536, 547, 99, 90, 488, 483, 262, 74, 71, 480,
630

[56] References Cited

U.S. PATENT DOCUMENTS

| | | | |
|---|---|---|---|
| 2,277,758 | 3/1942 | Hawkins | 52/98 |
| 3,258,887 | 7/1966 | Mostoller | 52/98 |
| 3,304,031 | 2/1967 | Mulquin | 52/98 X |
| 3,363,376 | 1/1968 | Wendel et al. | 52/262 |
| 3,386,215 | 6/1968 | Wendel et al. | 52/98 X |
| 3,407,546 | 10/1968 | Yates et al. | 52/64 X |
| 3,766,693 | 10/1973 | Richards et al. | 52/71 |
| 3,857,210 | 12/1974 | Austin | 52/90 X |
| 3,998,016 | 12/1976 | Ting | 52/547 X |
| 4,027,436 | 6/1977 | Daly | 52/98 X |
| 4,050,204 | 9/1977 | Scott | 52/262 |

Primary Examiner—Alfred C. Perham
Attorney, Agent, or Firm—Webb, Burden, Robinson & Webb

[57] ABSTRACT

A two-span wall panel construction includes a plurality of spaced, horizontal structural girts with liner panels secured between each three adjacent girts. Horizontally extending subgirts are attached to the liner panels and exterior panels are secured to the subgirts. The exterior panels are corrugated and mounted so that the corrugations extend parallel to the vertical structural columns. A plurality of notches is located on the outer surface of the exterior panel. The notches are aligned midway between the horizontal structural girts and can be varied in depth to cause the exterior panel to fail at the notch when subjected to a predetermined external load. Additional notches can be positioned on the inner surface of the exterior panel in alignment with the other notches. The adjacent, vertical liner panels are positioned in slightly spaced relationship at the end girts and the exterior panels are positioned in overlapping and unattached relationship at the end girts. Clips for holding the liner panels are secured to the end girts between the adjacent liner panels. These clips have angular flanges which pinch the adjacent liner panels against the end structural girts. External forces of predetermined magnitude cause the liner panels to deform about the middle girt as the liner panels pivot about and release from the clip flanges. Simultaneously, the overlapping exterior panels yield at their notched portions, release at their overlapping ends, and deform about the middle girt.

4 Claims, 10 Drawing Figures

CONTROLLED DESTRUCTIVE PANEL ASSEMBLY

FIELD OF THE INVENTION

This application is a continuation-in-part of a co-pending patent application filed by me on Apr. 30, 1976, Ser. No. 681,820 now U.S. Pat. No. 4,050,204, issued Sept. 27, 1977.

My invention relates to wall panel constructions and, more particularly, to a wall panel construction which will destruct when exposed to an external force of a predetermined magnitude such as a tornado or hurricane.

DESCRIPTION OF THE ART

Industrial buildings are often constructed of a structural steel framework which is clad with metal wall panels for weather protection. These wall panels include exterior panels, interior liner panels and insulation therebetween. These buildings are designed to withstand loading superimposed by the effects of wind. Certain structures such as electric power plants which may be the equivalent of twenty stories or more must be designed to withstand extraordinary loading of the type created by tornados or hurricanes even though these tornados or hurricanes may only occur on very rare occasions. The structural framework must then be extremely heavy as must be the foundations to withstand these exceptionally high loads.

When a tornado or hurricane hits, loads exceeding 100 pounds per square foot are often imposed on the windward side of the building. At the same time, eddy currents create severe negative forces on the leeward corners of the structure, thereby tending to cause this portion of the building to blow outward rather than inward. Explosions within the building are also a source of outward pressure exerted against the wall panels.

Traditionally, the wall panels in a two-span construction are fastened to the supporting structure with permanent fasteners, bolts, self-tapping screws or the like. These forms of connection result in the theoretical formation of five plastic hinges, one at each of three structural girts and one at each midpoint of the two spans, during failure.

Various forms of explosion relief wall structures have been proposed to solve the problems with internal explosions. Such wall structures are assembled with explosion release fasteners such as that described in U.S. Pat. No. 3,258,887 and others.

SUMMARY OF THE INVENTION

I have developed a wall panel system which will release the siding panels at a predetermined load thereby effectively reducing the windload which is carried through the structural framework. Thus, the framework need be designed only to support the predetermined release load, thereby allowing substantial economies in the design of the structural steel framework and the foundations. My design eliminates two of the five theoretical plastic hinges and controls precisely the formation of two plastic hinges, leaving only one to form of its own accord. This is true whether the panels are forced outward or inward of the building.

My wall panel construction includes a plurality of horizontal structural girts secured to vertical structural columns. Linear panels extend between each three girts to form a two-span construction. Horizontal subgirts are secured to the liner panels and exterior panels are connected to the subgirts. The exterior panels are corrugated and mounted so that the corrugations extend parallel to the vertical structural columns. A plurality of notches is located on the outer surface of the exterior panel. Additional notches can also be located on the inner surface of the exterior panel. The notches are aligned midway between the horizontal structural girts and can be varied in depth to cause the exterior panel to fail at the notch when subjected to a predetermined external load. Adjacent vertical liner panels terminate in slightly spaced relationship at the end girts and the vertically adjacent exterior panels overlap in unattached relationship. A clip having angular flanges is secured to the end girts between the adjacent space liner panels with the flanges of the clip pinching the adjacent liner panels against the end girts. At a predetermined external load, the liner and exterior panels deform inward. Failure first occurs at the notched portion of the exterior panels causing the portion of the exterior panel over the center girt of the three span construction to bear the full external load. Consequently, the liner and exterior panels release from the end girts and wrap around the center girt.

DESCRIPTION OF THE PREFERRED EMBODIMENTS

Figure 1:
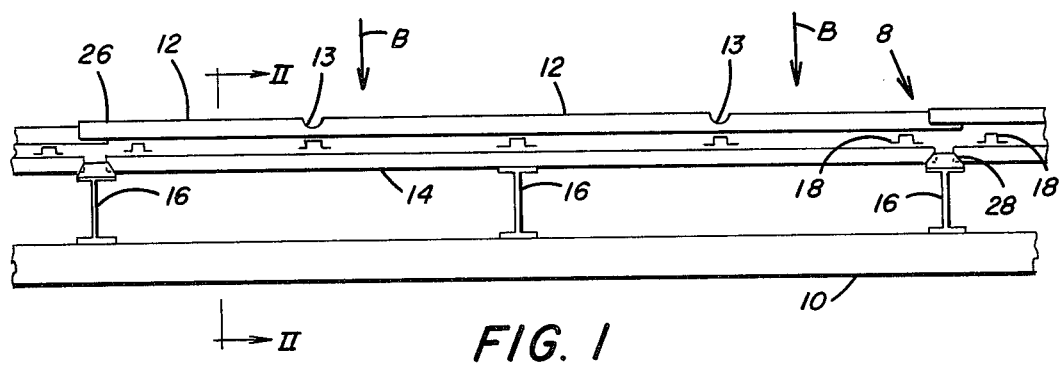
FIG. 1 is a section through a two-span wall panel construction.

The steel framework of a large structure such as a power plant or the like includes vertical, structural columns 10 to which the wall panel assembly, generally designated 8, is attached, FIG. 1. Secured to these vertical columns 10 are a plurality of spaced, horizontal structural girts 16. These steel girts 16 are commonly on eight or ten foot centers which then define the span for the wall panel assembly 8. The wall panel assembly 8 is designed to span across two such girt spaces creating what is known as a two-span wall panel construction.

Figure 2:
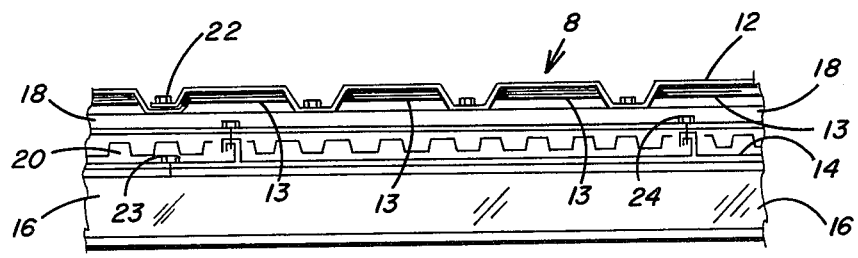
FIG. 2 is a detailed fragmentary section showing a typical wall panel assembly.

The general arrangement of the wall panel assembly 8 can thus be seen in FIG. 2. The exterior wall panels 12 are attached by means of appropriate fasteners 22 to steel subgirts 18 which extend in parallel relationship to the structural girts 16. the subgirts 18 in turn are secured to the liner panel 14 by means of self-tapping screws 24. The liner panel 14 is fastened to the center structural girt 16 of the three girts which make up the two-span wall panel construction by means of fasteners 23. The liner panel 14 is filled with insulation 20 for thermal control.

Figure 5:
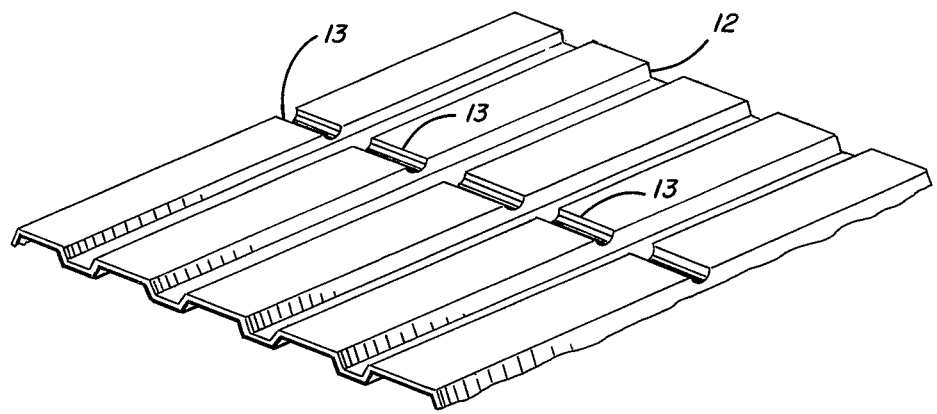
FIG. 5 is a fragementary isometic of an exterior wall panel showing the location of the notches.

The exterior wall panel 12 is corrugated and is mounted so that the corrugations extend parallel to the vertical columns 10, FIG. 1. A plurality of notches 13 is located on the outermost portion or outer surface of the exterior wall panel 12, FIG. 5. These notches are aligned midway between the structural girts 16, FIG. 1.

Figure 3:
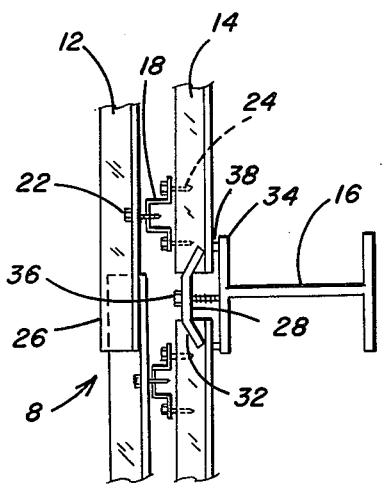
FIG. 3 is a fragmentary section showing the end lap connections.

The horizontal structural girts 16 actually support the entire wall panel assembly 8, FIGS. 1 and 3. The liner panels 14 are sealed against air leakage by means of a sealant 38 which is applied to the girt 16 before erection of the panels. A heavy gauge clip 28 or pinch plate (e.g. 7 to 12 gauge steel plate) serves as the means by which the liner panel 14 is held against the end girts 16 of the two panel span. Adjacent vertical liner panels 14 terminate in spaced relationship along the flanges 34 of the structural end girts 16 of the two-span construction. The clip 28 is secured to the flange 34 by means of a threaded fastener 36.

Figure 4:
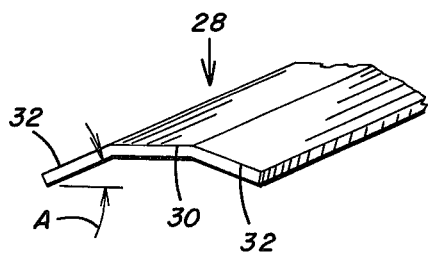
FIG. 4 is a fragmentary isometric of the clip.

To facilitate the securing of the clip 28 to the flange 34 of girt 16, clip 28 is constructed with a planar portion 30 through which the fastener 36 extends, FIG. 4. Clip 28 also includes two flanges 32 which each extend outwardly and lie in a plane at an angle from planar surface 30. When the clip 28 is secured in place, the flanges 32 pinch the ends of the respective spaced liner panels 14 against the flange 34 of the structural girt 16. The respective liner panels 14 overlap on the flange 34 a sufficient distance to assure a good clamping contact as the fastener 36 is tightened to pinch the liner panels 14 between the flanges 32 and the girt flange 34.

As stated, the exterior panels 12 are fastened to the subgirts 18 by means of appropriate fasteners such as sheet metal screws 22. The two-span exterior sheets 12 are dimensioned to overlap one another opposite the structural girt 16, FIG. 3. Normally, there is an overlap of the adjacent exterior panels 12 of about four inches and the respective exterior panels are arranged so that the upper panel laps down over the lower panel, thus allowing rain water to flow over the surface without leaking into the building. The end lap of the subject invention differs from the traditional end lap in that there are no fasteners in the area of the overlap joining the upper and lower exterior panels together. The liner panels 14 are also overlap and a subgirt is positioned in the area of the overlap opposite a structural girt. Again, as stated, the adjacent vertical liner panels 14 terminate so a space is formed therebetween.

Figure 7:
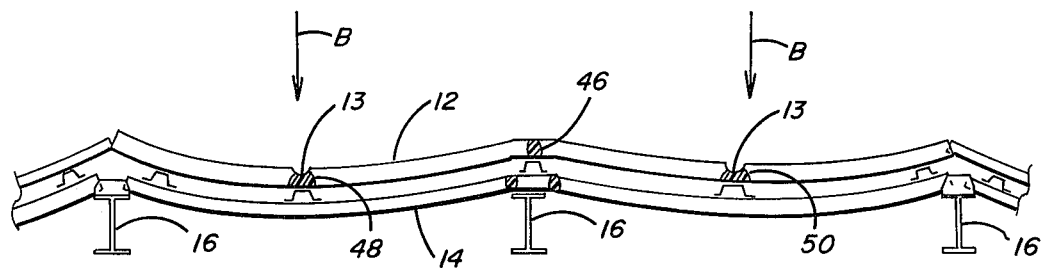
FIG. 7 is a vertical section through the two-span wall panel at the initial stages of an external destructive load.
Figure 8:
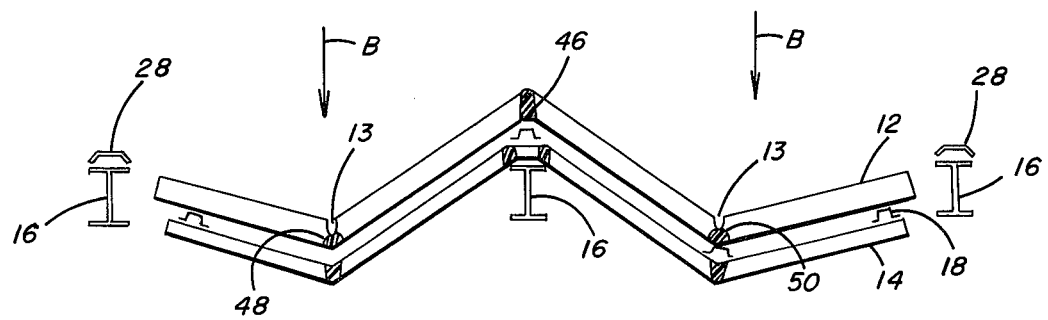
FIG. 8 is a vertical section of the two-span wall construction at failure.

FIGS. 1, 7 and 8 show the progression of action as the metal wall panels are subjected to severe inward forces caused by wind load and represented by arrows B. FIG. 1 illustrates the normal position of the wall panel 8 wherein it withstands the ordinary wind loading without any permanent deformation. FIG. 7 shows the manner in which the panels will initially deform when subjected to about two thirds of the design release load. The panel assembly 8 has a severe inward deflection which causes overstressing of both the exterior panel 12 and the liner panel 14. Distortion of the exterior panel 12 will occur initially at the points 48 and 50 located beneath the notches 13 midway between the structural girts 16 since the notches 13 decrease the section modulus of the panel at those points. In addition, the notches are located at the points having the highest bending moment on exterior panel 12. The distortion at points 48 and 50 is termed plastic hinge and represents the point at which the respective sheets no longer restore to a normal shape should the load be released.

Immediately after plastic hinges 48 and 50 have formed, the load is redistributed to the portion of the exterior panel 12 located between notches 13, substantially increasing the bending moment at a point along the exterior panel 12 directly over the middle girt 16 creating a plastic hinge 46 and causing the failure as predicted. With the addition of notches 13, the order in which plastic hinges 46, 48 and 50 form in the exterior panel 12 is the reverse of that disclosed in the parent application, Ser. No. 681,820 now U.S. Pat. No. 4,050,204 in that the initial plastic hinge does form at the center girt rather than midway between the girts. The advantage of a notched exterior panel is that two of the three plastic hinges formed, i.e., plastic hinges 48 and 50, can be accurately predicted and controlled leaving only the plastic hinge 46 to form of its own accord.

Figure 6:
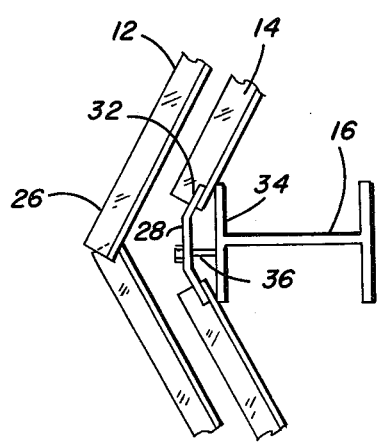
FIG. 6 is a fragmentary section showing the end lap connections during failure.

The effect of this severe inward deflection on the liner and exterior panel ends can be seen in FIG. 6. The liner panels 14 actually pivot about the ends of flanges 32 of the clip 28 as the load is increased. At the same time, the exterior panels 12 merely rotate relative to each other since the overlapping portions are not secured by fasteners. With a standard wall panel construction, an additional set of plastic hinges would form, i.e. at each of the end structural girts 16. However, the ability of the liner panels 14 to pivot about the clip 28 and the ability of the overlapping exterior panels 12 to pivot about each other eliminates this normal set of plastic hinges, thereby making the failure load more predictable and reproducible.

Figure 9:
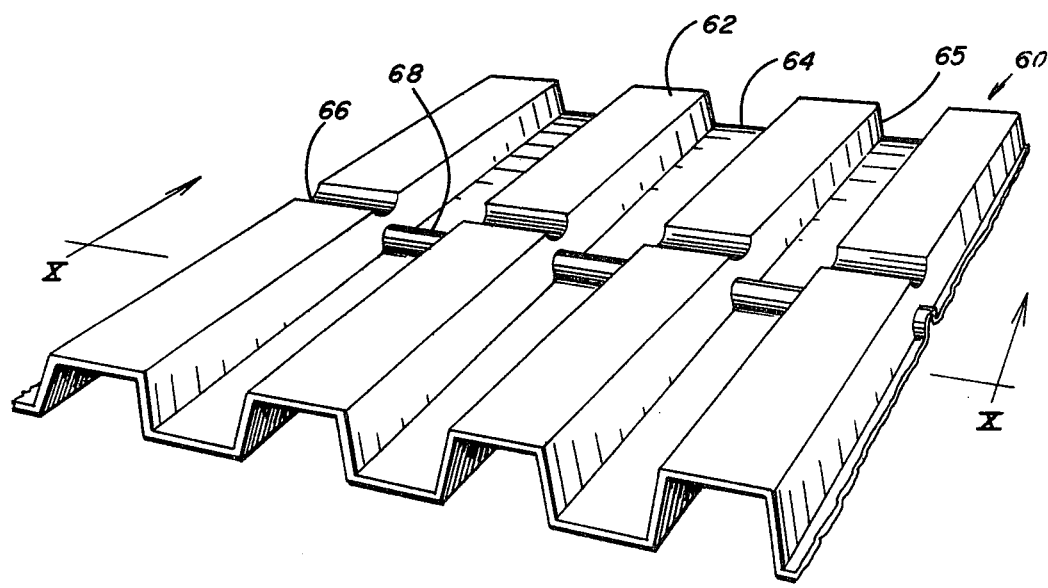
FIG. 9 is a perspective view of a modified embodiment.

As the deformation continues under load, the exterior and liner panels deflect severely and the liner panels 14 are literally pulled out from between the clip 28 and the flange 34 of the structural girt 16, FIG. 9. In the meantime, the end laps of the exterior panels 12 have rotated and separated also. Once the liner panel 14 is pulled out from the grip of clip 28, it is cantilevered about the center structural girt 16. Continuing wind forces cause the freed ends of the relatively long panel to deform even further and blow out of the way, literally wrapping around the center girt and freeing most of the girt space for the passage of the high velocity winds.

Figure 10:
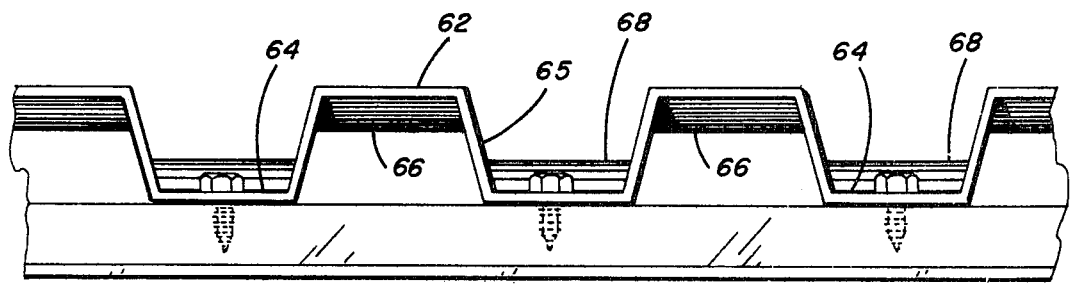
FIG. 10 is a section through the embodiment of FIG. 9.

In a preferred form of the invention, notches are provided on both the outer and inner surfaces, FIGS. 9 and 10.

Specifically, exterior panel 60 is corrugated so as to have peak surfaces 62 (outer surfaces) and valley surfaces 64 (inner surfaces) connected by joining surfaces 65. Notches 66 are provided in the peak surfaces 62 as in the earlier embodiment. In addition, notches 68 are provided in the valley surfaces 64. These notches 68 are in alignment with notches 66 and are concavely formed with respect to valley surfaces 64 just as notches 66 are concavely formed with respect to peak surfaces 62; thereby providing two sets of notches extending in opposing directions.

The reason for providing notches extending in opposing directions on the upper and lower surfaces respectively of the exterior panels is as follows. Should an inward force as illustrated in FIG. 7 be applied, the panel 60 will fail at notches 66 in the same manner as notches 13 of the embodiment of FIG. 7. However, should the applied force be from the other side of the panel as where a negative pressure creates a "blow out" condition, the panels will fail at notches 68 in the same manner. In other words, the plastic hinge forms on the compression side of the panel and the notch on the tension side is actually drawn out.

The following table illustrates how the depth of the notch can control the ultimate load at failure.

TABLE 1

Failure vs. Depth of Notch

| Panel Thickness | Test No. | Depth of Notch," | Load psf |
|---|---|---|---|
| 18 gauge | 1 | none | 147 |
| 18 gauge | 2 | 1/32 | 128 |
| 18 gauge | 3 | 1/16 | 123 |
| 18 gauge | 4 | 3/32 | 113 |
| 20 gauge | 5 | none | 85 |
| 20 gauge | 6 | 1/32 | 77 |
| 20 gauge | 7 | 1/16 | 75 |
| 20 gauge | 8 | 3/32 | 71 |
| 22 gauge | 9 | 1/32 | 56 |
| 22 gauge | 10 | 1/16 | 52 |
| 22 gauge | 11 | 3/32 | 48 |

From Table 1 it can be seen that increasing the depth of the notch effectively reduces the load required for failure. This permits a construction to be designed which will fail at an accurately predetermined load. The panels that had no notches failed in a random buckling fashion in the area of the panel midpoints, whereas the notched panels failed along an imaginary line formed by the notches.

With regard to the clip 28, it has been found that an included angle of 10°; designated A in FIG. 4, provides on the one hand an adequate clamping force to hold the liner against the structural girt, and on the other hand permits free rotation therearound during failure.

With the implementation of the panel assembly described above, the main structure and foundation need only withstand the designed failure load, for example, 60 pounds per square foot, since at hurricane or tornado wind loads the panels will release and permit the winds to pass through the girt spaces without destroying the basic structure or foundation. And on the rare occasion when a tornado or hurricane strikes, the panels are considered expendable and can be replaced at substantially lower costs than that of originally building a greatly over-designed structure and foundation.

I claim:

1. A wall panel construction comprising:
   A. a plurality of spaced, horizontal structural girts secured to vertical, structural columns;
   B. liner panels extending between each three girts with vertically adjacent panels terminating at end girts of the three in slightly spaced relationship;
   C. a plurality of spaced, horizontal subgirts secured to the liner panels with certain of the subgirts positioned on either side of the end girts;
   D. corrugated exterior panels extending between each of the three girts so that the corrugations are parallel to the vertical, structural columns and connected to the subgirts with vertically adjacent panels overlapping in unattached relationship, the corrugated exterior panels having a plurality of notches positioned on the exterior panel transverse of said corrugation and aligned midway between the horizontal structural girts;
   E. a clip having angular flanges and secured to said end girts between the adjacent spaced liner panels, the fanges of said clip pinching the adjacent liner panels against the end girts;
   F. means to attach the liner panels to a middle girt of the three girts;
   whereby an external force of predetermined magnitude against the wall panel construction causes the adjacent liner panels to deform about the middle girt as the liner panels pivot about and release from the clip flanges while simultaneously the overlapping, exterior panels pivot and release at their overlapping ends.

2. The wall panel construction of claim 1 wherein the corrugated exterior panels include a plurality of peak surfaces and valley surfaces, said notches positioned on at least said peak surfaces.

3. The panel construction of claim 2 wherein the corrugated exterior panels include notches on both the peak and valley surfaces, said notches being aligned with the notches on the peak surfaces extending in opposing relationship to the notches on the valley surfaces.

4. In a wall panel construction including liner panels and exterior panels in assembled relationship with structural girts, said exterior panels defined by corrugations having peak surfaces, valley surfaces and surfaces connecting the peak surfaces and the valley surfaces, the improvement comprising a plurality of notches extending transverse of the corrugations in aligned relationship and positioned in at least one of said surfaces, said notches further positioned substantially midway of adjacent structural girts.

* * * * *

UNITED STATES PATENT AND TRADEMARK OFFICE
CERTIFICATE OF CORRECTION

PATENT NO. : 4,094,108

DATED : June 13, 1978

INVENTOR(S) : Harley D. Scott

It is certified that error appears in the above-identified patent and that said Letters Patent are hereby corrected as shown below:

Column 1 Line 67 "Linear" should read --Liner--.
Column 2 Line 64 "the" (second occurrence) should read --The--.
Column 3 Line 47 Delete --are--.
Claim 1 - Column 6 Line 18 "fanges" should read --flanges--.

Signed and Sealed this

Seventh Day of November 1978

[SEAL]

Attest:

RUTH C. MASON
Attesting Officer

DONALD W. BANNER
Commissioner of Patents and Trademarks